United States Patent [19]

Williams et al.

[11] Patent Number: 5,906,337
[45] Date of Patent: May 25, 1999

[54] MULTIPLE ALTITUDE SATELLITE RELAY SYSTEM AND METHOD

[75] Inventors: Brian R. Williams, Orange; Peter H. Cress, Manhattan Beach, both of Calif.

[73] Assignee: TRW Inc., Redondo Beach, Calif.

[*] Notice: This patent is subject to a terminal disclaimer.

[21] Appl. No.: 08/694,466

[22] Filed: Oct. 3, 1995

[51] Int. Cl.$^6$ .............................. B64G 1/10; H04B 7/185; H04B 7/19
[52] U.S. Cl. ...................... 244/158 R; 342/355; 455/13.1
[58] Field of Search ................ 244/158 R; 392/356, 392/357, 355; 701/13; 455/12.1, 13.1

[56] References Cited

U.S. PATENT DOCUMENTS

| | | | |
|---|---|---|---|
| 3,163,820 | 12/1964 | Hight . | |
| 3,452,356 | 6/1969 | Stoney | 342/357 |
| 3,471,856 | 10/1969 | Laughlin, Jr. et al. . | |
| 3,540,048 | 11/1970 | Clemens, Jr. et al. | 343/100 |
| 3,742,498 | 6/1973 | Dunn | 343/100 |
| 3,993,997 | 11/1976 | Jackson | 343/112 |
| 4,004,098 | 1/1977 | Shimasaki . | |
| 4,375,697 | 3/1983 | Visher | 455/13 |
| 4,502,051 | 2/1985 | Dondl | 343/356 |
| 4,652,884 | 3/1987 | Starker | 342/357 |
| 4,726,224 | 2/1988 | D'Auisilio | 340/686 |
| 4,819,053 | 4/1989 | Halavais | 342/359 |
| 4,843,397 | 6/1989 | Galati et al. | 342/354 |
| 5,041,833 | 8/1991 | Weinberg | 342/357 |
| 5,046,006 | 9/1991 | Revord et al. . | |
| 5,099,235 | 3/1992 | Crookshanks | 340/826 |
| 5,119,225 | 6/1992 | Grant et al. | 244/158 |
| 5,199,672 | 4/1993 | King et al. | 244/158 R |
| 5,218,467 | 6/1993 | Ross et al. | 342/357 |
| 5,394,561 | 2/1995 | Freeburg | 455/13.1 |
| 5,396,643 | 3/1995 | Frenzer et al. | 455/13.1 |
| 5,412,660 | 5/1995 | Chen et al. | 370/110.1 |
| 5,414,432 | 5/1995 | Penney, Jr. et al. | 342/357 |
| 5,423,084 | 6/1995 | Vatt | 455/13.1 |
| 5,430,729 | 7/1995 | Rahnema | 270/94.1 |
| 5,433,726 | 7/1995 | Horstein et al. | 244/158 R |
| 5,717,404 | 2/1998 | Malla | 342/352 |
| 5,722,042 | 2/1998 | Kimura et al. | 455/13.1 |

FOREIGN PATENT DOCUMENTS

| | | |
|---|---|---|
| 0059454 | 9/1982 | European Pat. Off. . |
| 3421855 | 12/1985 | Germany . |
| 3605096 | 8/1987 | Germany . |
| 2128996 | 5/1990 | Japan . |
| 3270422 | 12/1991 | Japan . |
| 472000 | 3/1992 | Japan . |
| 479429 | 3/1992 | Japan . |
| 496528 | 3/1992 | Japan . |
| 8804866 | 6/1988 | WIPO . |

OTHER PUBLICATIONS

A Search and Rescue Satellite System in Addition to Inmarsat, J.Nauck; 33rd Congress of the International Astronautical Federation, Sep. 27–Oct. 2, 1982.

A Polar Orbiting Satellite System as an Extension of Inmarsat, J. Nauck, K. Plate and B. Bischof; 35th Congress of the International Astronautical Federation, Oct. 7–13k, 1984.

A. R. Collar and J. W. Flower, A (Relatively) Low Altitude 24–Hour Satellite May 28, 1969.

R. A. Stampfl, Relay Satellite Systems (TDRS).

Primary Examiner—Virna Lissi Mojica
Attorney, Agent, or Firm—Michael S. Yatsko

[57] ABSTRACT

A multiple altitude satellite relay system is disclosed in which Medium Earth Orbit satellites are continuously linked with at least one Geosynchronous satellite to provide uninterrupted relaying of messages and data. The Medium Earth Orbit satellites are synchronized with the Geosynchronous satellites to produce continuous links. A parameter to achieve the synchronization involves the positions of the Medium Earth Orbit satellite relays relative to the positions of the Geosynchronous satellite relays. Another parameter to achieve synchronization involves the ratio between the orbital periods of the Geosynchronous satellite relays relative to the orbital periods of the Medium Earth Orbit satellite relays. These parameters may be further adjusted to provide continuous links above the horizon of the earth.

36 Claims, 9 Drawing Sheets

MULTIPLE ALTITUDE SATELLITE RELAY SYSTEM AND METHOD

BACKGROUND OF THE INVENTION

1. Field of the Invention

The present invention relates generally to satellite communications. More particularly, the present invention relates to a method and system of satellites which are capable of providing continuous unbroken links between satellites disposed at different altitudes, such as a satellite in Medium Earth Orbit and a satellite in Geosynchronous orbit.

2. Description of the Prior Art

Communication and data satellite relays are used to facilitate the transfer of information between two locations. The locations could be satellites or ground stations. These "users" may need to use a relay method due to any of the following reasons: (1) the earth is between the user and a location with which the user wishes to communicate; (2) the user cannot point in the direction of its intended location, but is able to point to a relay; (3) the user does not have the power or equipment to communicate directly with the desired remote location. The principal factors of consideration for satellite relays are the following: (1) cost; (2) effectiveness (such as, data rate, coverage, number of users, and so forth); (3) complexity; (4) the burden on the user in terms of the amount of power and specialized equipment which is required by the user to communicate with the satellite relay; (5) transition from old relay systems to a new one; (6) and flexibility.

Geostationary satellites may be used as relay stations since the geostationary satellites would be stationary over the earth and thus the ground stations could use a fixed antenna. Their advantage is that ground users see a relatively low change in the line-of-sight (LOS) from the users to the geostationary satellite relay. Also, geostationary satellites are more difficult for an adversary to destroy due to the greater energy required of the intercept vehicle and the long warning time.

However, geostationary satellites are not without disadvantages in a communication relay application. They require large boosters to launch to the high geostationary altitude of 22,300 miles (35,900 km) above the equator; and due to the high altitude, they require large antennas to transmit and receive radio frequency (RF) signals. Likewise, users are required to carry larger antennas to transmit and receive signals with a satellite at the geostationary altitude.

Other disadvantages with geostationary satellite relays are that the geostationary orbit is relatively crowded as it extends around the equator and at least 3 geostationary satellites would be required to cover most ground stations. Also, spares are expensive, and an inclined-orbit would be needed to provide service to the ground high latitudes. The use of a geosynchronous satellite with its inclined orbit would virtually eliminate the stationary, fixed user antenna advantage and would require more satellites to provide good coverage to all latitudes.

In general, geostationary satellites with any type of satellite link suffer these disadvantages. In the field of the present invention, a satellite link entails an unidirectional or bidirectional transmission of information between a satellite and another entity via radio frequency, laser, or other suitable signal conveying techniques. The other entity may be another satellite, a ground station, or some other entity capable of transmitting or receiving signals through space, such as an airplane or space station.

Satellite relays at lower altitudes could also be considered, such as Low Earth Orbit (LEO), Medium Earth Orbit (MEO), or Highly Elliptical Orbit (HEO). However, lower altitude satellite relays require many more satellites to cover the earth to provide continuous service. When more than one satellite relay is used in coordination to cover the earth, the multiple satellite relays are collectively termed a "constellation".

Lower altitude satellite relays are also more vulnerable to attack and have relatively high angular LOS rates and more frequent "make/Lreak" requirements. HEO satellites operate most of the time near a geosynchronous altitude, with many of the same advantages and disadvantages of geosynchronous satellites. HEO links must be made and broken, although less frequently than at LEO or MEO altitudes. Lastly, to link with a ground station, the lower altitude satellite relays usually need to establish communication links with other satellite relays in their constellation. This cross-linking among other satellite relays in the constellation results in a complex series of routing and making and breaking of communication links.

These systems route the signal through the use of cross-links, which are intelligent switches and routers on board each satellite, among many satellites. This "intelligent switch/router" in space is a major drawback since these satellite systems have to point at other satellites and have the complexity of determining who should be the recipient satellite of the message. The situation becomes even more complex if the selected recipient satellite is overloaded with other data transmissions. Such a situation forces the sending satellite to reroute the message to another satellite.

Therefore, it is an objective of the present invention to provide a satellite relay system that is less complex, more flexible, more robust to potential problem conditions, and lowers the user burden to perform the relay function.

It is another objective of the present invention to provide a satellite relay system in which cross links are not interrupted, and therefore avoids the need for a first satellite to break its communication link with a second satellite and to establish a new link with a third satellite as the second satellite moves behind the earth relative to the first satellite.

Another objective is to provide uninterrupted cross links that are always above the horizon, i.e., the line of sight or its extension never intersects the earth.

It is a further objective of the present invention to provide a satellite relay system that consumes less power by requiring smaller satellites to act as satellite relays of RF or laser signals.

SUMMARY OF THE INVENTION

The present invention provides one or more geostationary or geosynchronous (GEOS) satellite relays in synchronization with one or more medium earth orbit (MEO) satellite relays to produce continuous links between these two sets of relays. Such a synchronized arrangement of satellites has the advantage of requiring less user burden since earth-based users do not need to transmit to GEOS altitudes. This type of hybrid system (that is, one or more MEO satellites synchronized with one or more GEOS satellites) accepts the burden of transferring the signal up to GEOS altitude and back to the ground. Also, the hybrid system requires smaller launch vehicles and is more robust since an interruption of one of the MEO relay communication links will affect the system less than an interruption in a pure GEOS-based satellite relay system.

Moreover, the hybrid system uses fewer GEOS satellite relays (as few as one) but can still provide continuous links with the ground because of the unique synchronization between the GEOS and the MEO satellite relays. Consequently, cross-links are not required between MEO satellite relays, even though such cross-links could be provided in the appropriate application.

The present invention may also be configured to provide continuous above-the-horizon (ATH) communication links. ATH communication links have the additional advantages of: (1) avoiding interference in either direction from light or radio-frequency sources on earth or from GEOS radiated interference to terrestrial communications; and (2) reducing the potential for intercept of a signal by terrestrial sites.

The present invention may be used for several different types of communication applications. For example, in the case of military communications, a dispersed user set (such as troops in the field or military satellites) need information from one or more ground stations, or information from a user in the field may need to be transmitted to those ground stations. The present invention could also be used for general commercial purposes if dispersed users need to communicate with one or more designated ground stations within sight of the GEOS or MEO-GEOS-MEO satellite relay(s). Further communication to and from users on the ground could be accomplished by relaying the information from the ground station back through the MEO-GEOS satellite relay chain. The communication data could be any form of communication data, including without limitation, video and other high data rate signals. The communication signals could be RF signals, light-based signals (such as lasers) or any other suitable LOS transmittable signal.

Another envisioned user of the multiple altitude satellite system could be a set of satellites placed in a MEO position that is synchronized with GEOS satellite so as to be directly and continuously linked with the GEOS satellite. The GEOS satellite would then relay information from the MEO satellites directly to the ground. The advantage would be a single-hop communication relay. Also, the need to reconnect a link after it is broken, as is the case in most relays to GEOS satellites, is eliminated since the users themselves are now synchronized with the GEOS satellites.

Another application of the present invention involves a non-geosynchronous orbiting satellite constellation (such as a MEO satellite constellation) being cross-linked with one another and synchronized with one or more GEOS satellites. The MEO cross-links could be used for low data rate information transfer, such as handheld voice purposes, where the relatively small antenna or laser optics size and low power required by the low data rate would be advantageous. The satellite constellation's synchronized link with the GEOS satellite could then be used for high data rate information transfer, where continuous links are important.

Still another application of the present invention involves a GEOS satellite observing a MEO satellite for detection of any problem conditions with the MEO satellite. The GEOS satellite being synchronized with the MEO satellite in accordance with the present invention permits uninterrupted observation of the MEO satellite due to the continuous line-of-sight that exists between the two satellites. Thus, it should be understood that the present invention is applicable to satellites whose functions may not include communication or data relaying. While the term "relay" is repeatedly used in this specification, it should be understood that the present invention is not limited to satellites whose primary function is to relay information.

For example, a system of a GEOS satellite and one or more MEO satellites may provide the function of sampling solar radiation. For the purposes of comparing the GEOS satellite's sampled solar radiation data and the MEO satellites sampled solar radiation data, the MEO satellites send their sampled solar radiation data to the GEOS satellite. The GEOS satellite then processes all of the sampled radiation data and sends the results to the ground. In this example, the features of the present invention are used for more than relaying data.

Furthermore, it should be understood that a ground-based user is not needed in the present invention. The end user may in fact be another satellite, space station or otherwise mobile user.

DETAILED DESCRIPTION OF THE PREFERRED EMBODIMENT

Figure 1:
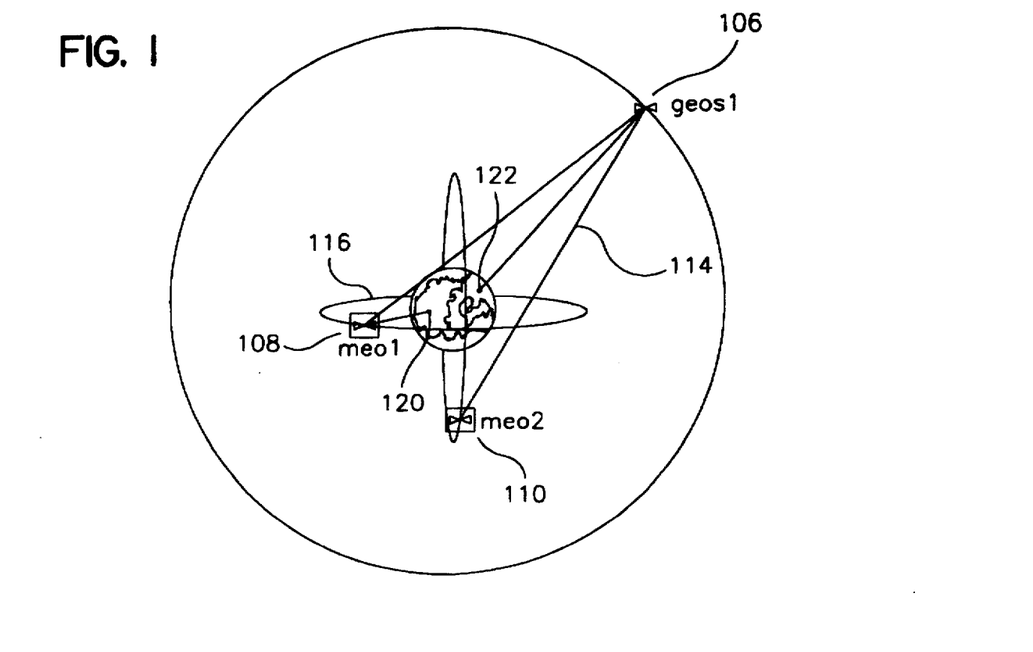
FIG. 1 is a three-dimensional view depicting a two-HOP multiple altitude satellite relay embodiment according to the present invention with two Medium Earth Orbit satellite relays and one GEOS satellite relay.

Referring to FIG. 1, a first embodiment of a multiple altitude satellite system according to the present invention is shown. More specifically, FIG. 1 shows a configuration of one GEOS satellite relay (geos1 106)and two MEO satellite relays (meo1 108, and meo2 110). The geos1 106 is continuously in line-of-sight contact with meo1 108 and meo2 110.

A user 120 who cannot communicate directly with a remote earth-based station 122 can communicate with meo1 108, which in turn is linked continuously with geos1 106 satellite relay. Since geos1 106 is in continuous contact with the earth-based station 122, geos1 106 can forward the communication from meo1 108 to the earth-based station 122.

Althogh a MEO satellite relay has to point its antenna over a large portion of the sky to link with the GEOS satellite relay, its link is not broken, so it does not have to spend time acquiring another relay. Also, the track path repeats, thereby decreasing the complexity of the tracking algorithm.

One synchronization parameter of the MEO and GEOS satellite relays is the ratio of their periods. A continuous line-of-sight between a MEO satellite relay and a GEOS satellite relay is achievable for several ratios that represent integer factors of twenty-four.

In the preferred embodiment, the period ratio between the GEOS satellite relay's period and the MEO satellite relay's period is 24:8 or equivalently 3:1. A 3:1 period ratio is achieved when the period of the GEOS satellite relay is three times the period of a MEO satellite relay. Thus, a GEOS satellite relay period of twenty-four hours and a MEO satellite relay period of eight hours will produce a 3:1 period ratio. It must be noted that the GEOS satellite relays in the present invention refer to geosynchronous satellites in general and not only to geostationary satellites. The distinction between the two is that a geostationary earth orbit is a geosynchronous orbit with a zero degree inclination-that is, an equatorial-only orbit. Consequently, a geostationary earth orbit is a specific type of geosynchronous orbit. Moreover, polar orbits are used as examples for the MEO satellites, and the equatorial GEOS orbit is used as an example for the GEOS satellites. Neither the MEO satellite relays nor the GEOS satellite relays are limited to these inclinations.

In fact many more combinations of GEOS and MEO satellite relays are possible, including varying the number of GEOS and MEO satellite relays, the number of orbit planes of GEOS and MEO satellite relays, the inter-orbit and intra-orbit phasings of the MEO satellite relays, and the inter-orbit and intra-orbit phasings of the GEOS satellite relays. For example, it should be understood that the GEOS satellite relay could be in a polar orbit, or at an orbital altitude which is non-synchronous to the earth. The present invention can be practiced with the MEO or GEOS satellite relay orbits being circular or elliptical. Also in many MEO satellite relay configurations under the present invention, proper placement of multiple GEOS satellite relays will allow each of the GEOS satellite relays to continuously view all of the MEO satellite relays. MEO satellite relay constellations of 3, 6, 9, or 12 MEO satellite relays with three GEOS satellite relays being 120 degrees apart are examples of this aspect of the present invention. In such a configuration, each GEOS satellite relay can provide complete backup of the other GEOS satellite relays. While FIG. 1 shows the use of two orbits for the meo1 and meo2 satellites, it should be understood that both of these satellites could be in a single orbit. Similarly, it should be noted that the present invention is not dependent upon the number of MEO orbits, as the number of orbits may be modified (such as 1, 2, 3, 4, and so forth).

The various configurations can achieve a continuous line-of-sight when: (1) the period ratio is synchronized; and (2) the distance of the line-of-sight from the earth is synchronized with the position of the GEOS satellite relay and the inclination angle of the MEO satellite relay. A more detailed discussion of the synchronization involving the distance of the line-of-sight from the earth begins at FIG. 2.

Figure 2:
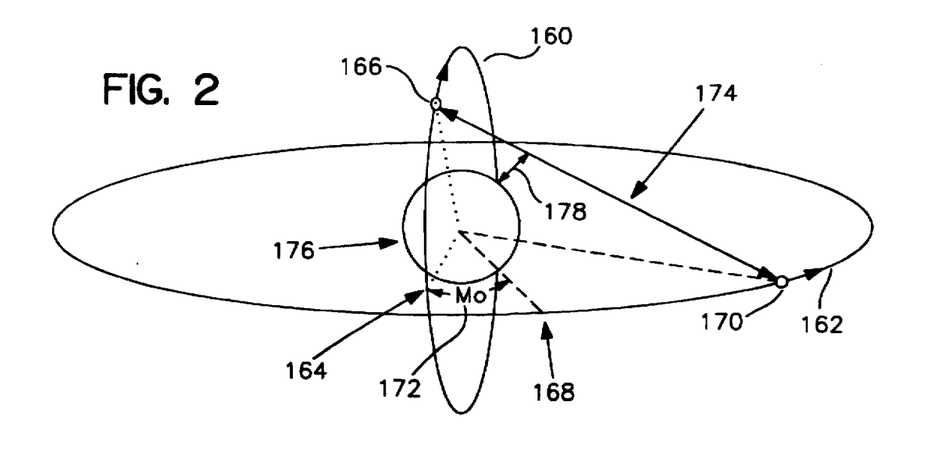
FIG. 2 is a three-dimensional view depicting the synchronization relationship employed by a multiple altitude satellite relay system according to the present invention.

FIG. 2 shows a polar MEO orbit plane 160 and an equatorial GEOS orbit 162. In this example, the initial position 164 of the MEO satellite relay 166 is assumed to start at the equator and ascend North. The initial position 168 of the GEOS satellite relay 170 is assumed to start at an angle "Mo" 172 from the polar MEO orbit plane 160. As the MEO satellite relay 166 and GEOS satellite relay 170 move in their respective orbits, a line can be drawn between them which is the line-of-sight (LOS 174).

The LOS 174 is not obstructed by the earth 176. The altitude of the LOS 174 above the earth 176 is called the tangent altitude 178. If the tangent altitude 178 becomes negative, the LOS 174 would be broken. The minimum tangent altitude over one GEOS satellite relay orbit is determined for an LOS 174 since that number will indicate how close a satellite relay system is to losing its LOS 174. Correspondingly if the minimum tangent altitude is large, then the relative positions of the MEO satellite relay and GEOS satellite relay can be varied greatly before the tangent altitude 178 was reduced to zero and the LOS 174 lost.

Figure 3:
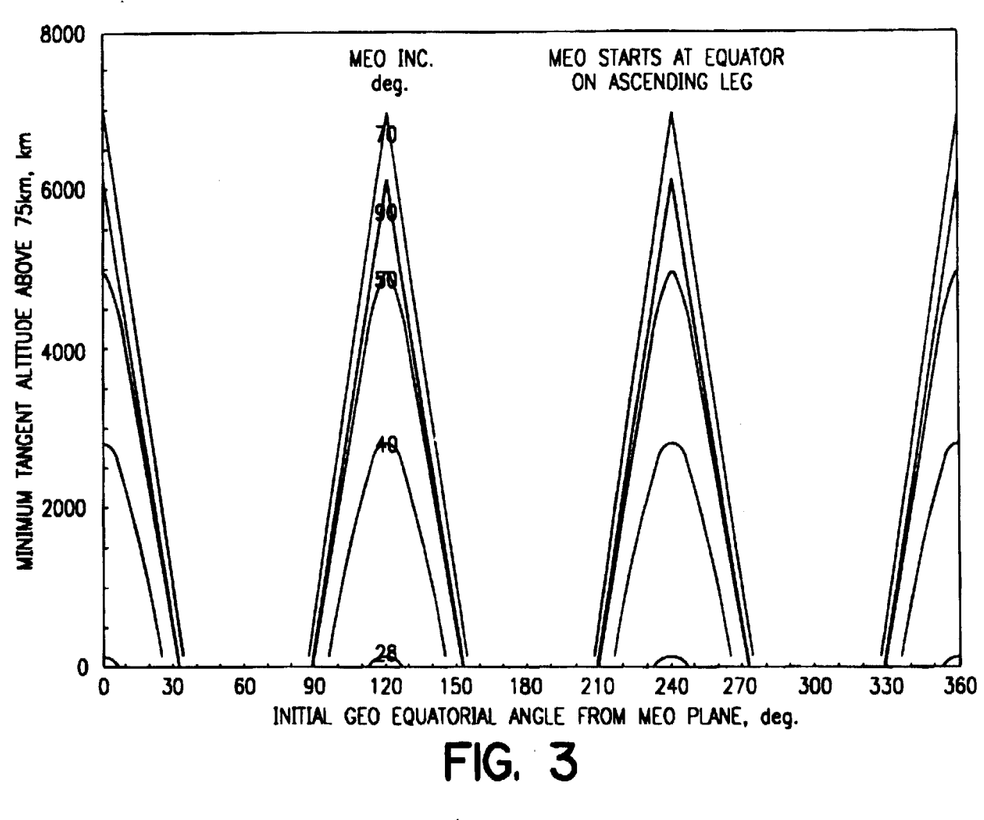
FIG. 3 is a graph showing initial GEOS satellite relay equatorial angle from a MEO satellite relay plane versus minimum tangent altitude above 75 kilometers for valid GEOS satellite relay ranger for an embodiment employing an eight-hour MEO period.

FIG. 3 shows the relationship between the initial GEOS equatorial angle from MEO plane ("Mo") and the minimum tangent altitude of the LOS of an eight-hour MEO circular orbit. These relationships are shown for a range of MEO orbit inclinations. The orbit configuration of FIG. 2 corresponds to the teepee-shaped curves labeled "90" degrees inclination. Any point under the teepee-shaped 90 degree curves represents an initial GEOS/MEO satellite relay relationship that results in an uninterrupted LOS. Thus, the GEOS satellite relay's initial angle (Mo) could be within the three ranges of 330–30, 90–150, and 210–270 degrees, and would still maintain a continuous LOS. These ranges become slightly larger if the MEO satellite relay orbit is inclined at 70 degrees, and are smaller at MEO satellite relay inclinations of 50, 40, or 28 degrees. The minimum inclination of 28 degrees is significant in that it allows a wide range of MEO satellite relay orbits at inclinations from less than 28 to 90 degrees. The large range of possible configurations indicates that similar continuous LOS results would be obtained for certain classes of elliptical orbits.

Figure 4:
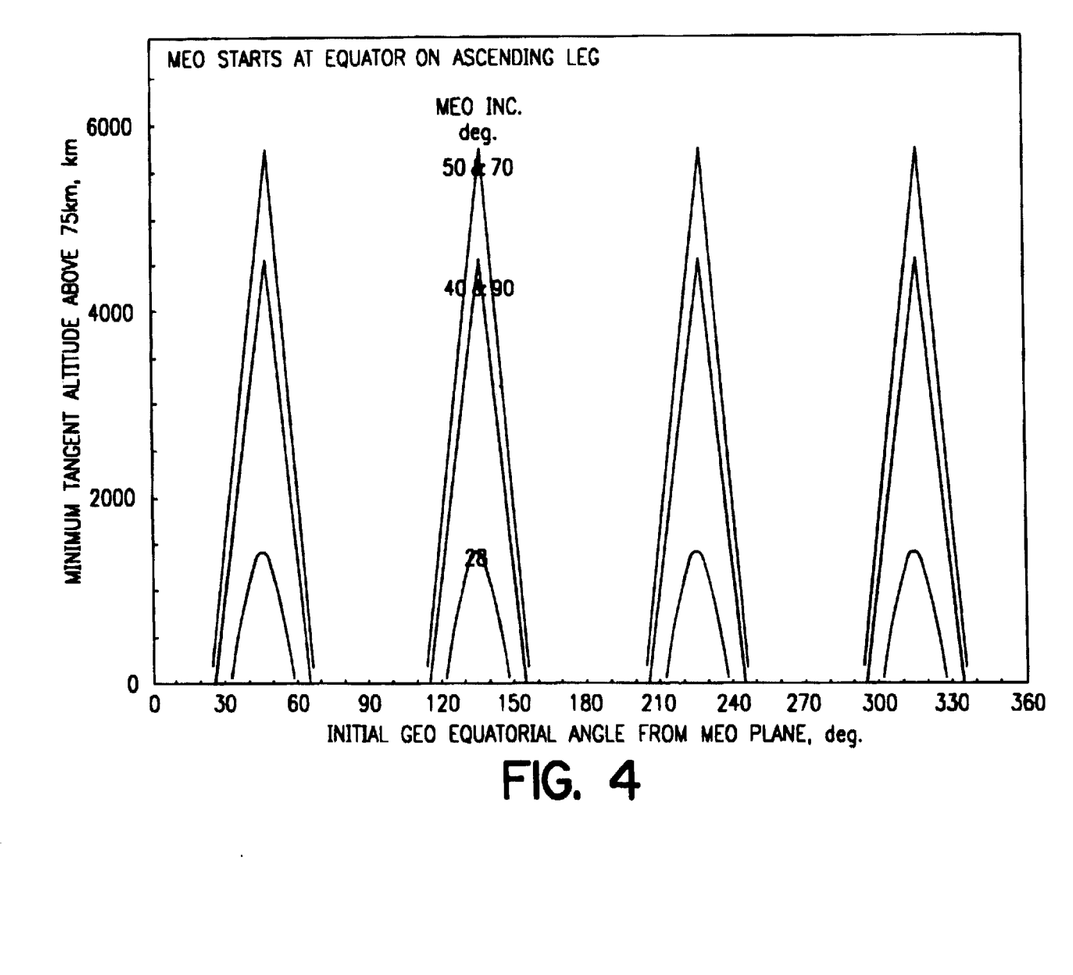
FIG. 4 is a graph showing initial GEOS satellite relay equatorial angle from a MEO satellite relay plane versus minimum tangent altitude above 75 kilometers for valid GEOS satellite relay ranges for an embodiment employing a twelve-hour MEO period.

FIG. 4 shows similar data for a twelve-hour MEO satellite relay orbit. For the MEO satellite relay inclinations shown, the inclinations that provide the largest minimum LOS values are at 50 and 70 degrees. This indicates that the largest value lies within that range. Also instead of three "teepees" as in the eight-hour MEO satellite relay orbit graph, the twelve-hour MEO satellite relay orbit has four "teepees", each in approximately 40 degree range. Thus, FIG. 3 and FIG. 4 can be used to determine a MEO satellite relay position and GEOS satellite relay position that will result in continuous LOS for an eight-hour and twelve-hour MEO satellite relay orbit respectively.

The references to an eight-hour or twelve-hour orbit do not indicate that the period of the orbit is exactly eight or twelve hours. The referenced period is the period that is closest to the eight or twelve hours that provides a retrace orbit. Thus the ground trace (which is the trace of the point directly below the satellite) exactly retraces the same path on the earth every twenty-four hours which concept is illustrated in FIG. 5.

Figure 5:
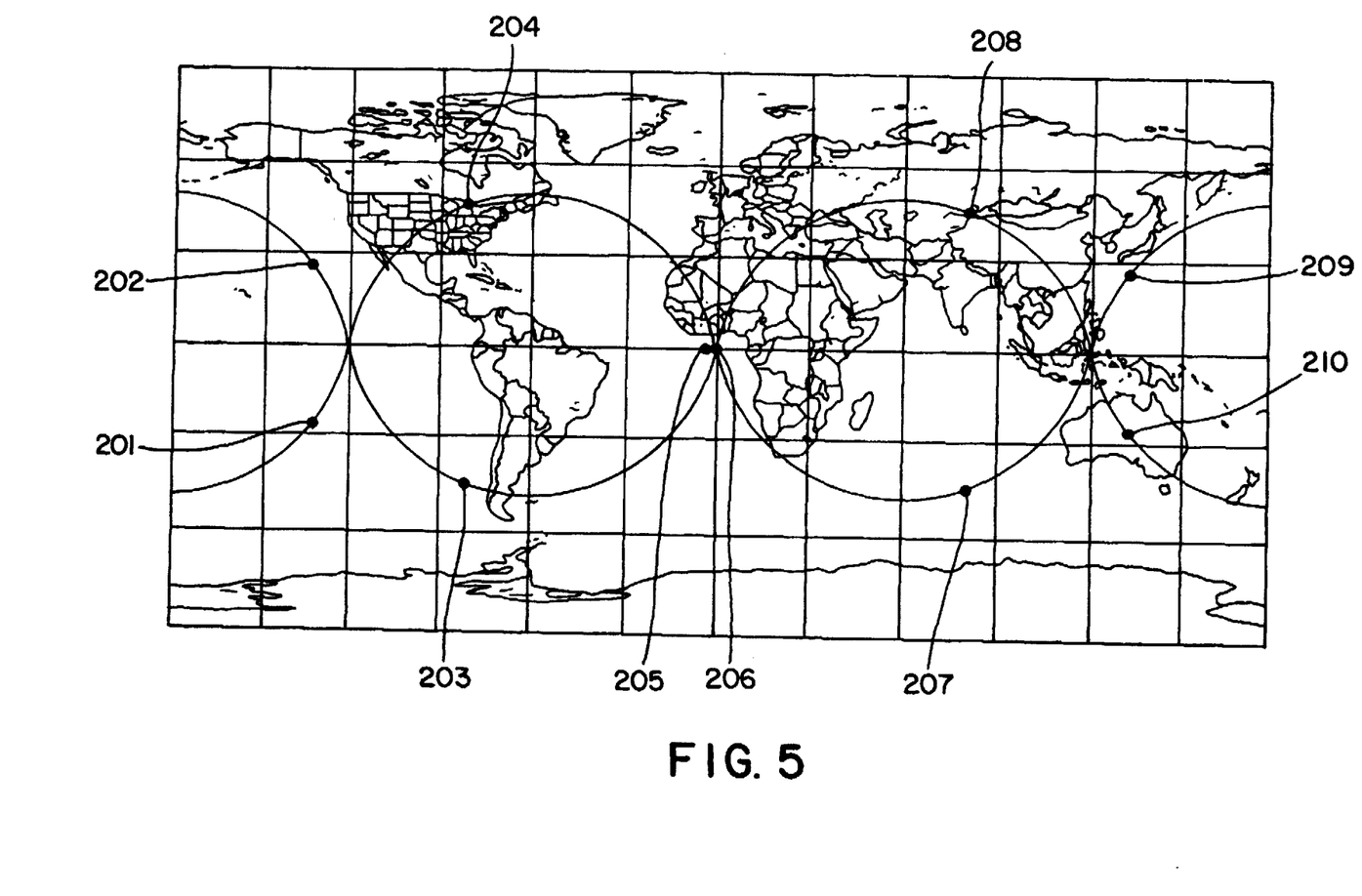
FIG. 5 is a Cartesian world map showing the path that a ten MEO satellite relay embodiment traces upon the earth.

FIG. 5 shows a configuration of ten MEO satellite relays at positions 201 through 210 respectively. FIG. 5 shows the ten MEO satellite relays tracing a path on the surface of the earth over a twenty-four hour period. The ten MEO satellite relays in the FIG. have the following configuration: 10 orbit planes; 8 hour period; an altitude of 7501 nautical miles; a 252 degree inter-orbit phasing; 36 degree node spacing; and an inclination angle of 50 degrees.

Figure 6:
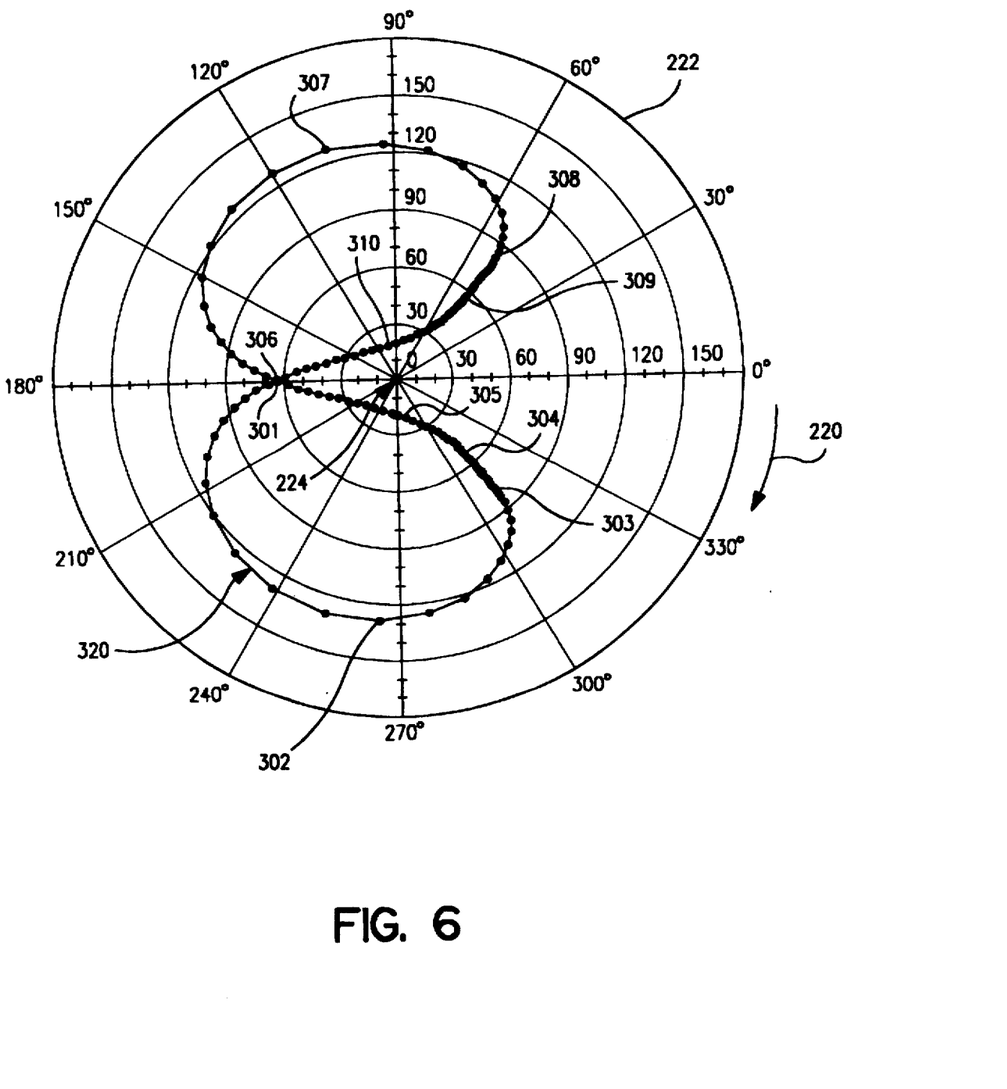
FIG. 6 is a polar plot showing the line-of-sight between a ten MEO satellite relay embodiment and a GEOS satellite relay as viewed from the ten MEO satellite relay embodiment.

FIG. 6 uses the same satellite relay configuration to show the LOS path 320 from the view of each of the ten MEO satellite relays relative to the GEOS satellite relay at a given point in time. The graph itself is a polar plot. The counter-clockwise circumferential value is the value of the yaw 220 of the LOS, with the yaw being the degree of rotation about a satellite's vertical axis. Thus, the yaw value for each of the MEO satellite relays can be viewed as a pivoting of the LOS about a vertical line.

The radial measure of the plot indicates the extent to which the LOS is pointing up or down relative to the center of the earth. For example, if a point were placed on the outer edge 222 of the plot, it would indicate that the MEO satellite relay is "looking" straight up at the GEOS satellite relay and 180 degrees away from the center of the earth. If the point were at the center 224, the satellite is looking straight down towards the center of the earth. Hence, the center 224 of the graph represents the nadir position of a satellite.

FIG. 6 depicts that the LOS from each MEO satellite relay to the GEOS satellite relay varies throughout a twenty-four period. The time marks on the graph are at twelve minute intervals. Positions 301 to 310 indicate the respective start point of each of the ten MEO satellite relays. Although the ten MEO satellite relays start at a different point, they follow the same path over a twenty-four hour period. The ten MEC satellite relays will repeat this LOS path 320 every twenty-four hours.

The skewed "figure eight" shape of the LOS path 320 shows that for this configuration a MEO satellite relay does not look straight down at the center of the earth. In contrast, if a MEO satellite relay did look straight down at the center of the earth, it would have to look through the earth to see the GEOS satellite relay. Thus, the LOS would be broken and the satellite relay configuration would not result in a continuous LOS. Instead, the LOS angle from nadir is large enough to "lift" the LOS higher than the surface of the earth, with the earth limb being at a nadir angle of about 18 degrees FIG. 7 likewise uses the same satellite relay configuration to show the LOS path 380 from the view of the GEOS satellite relay relative to each of the ten MEO satellite relays at a given point in time. On this graph, the angular excursions are not nearly as large. Once again, the time marks on the graph are at twelve minute intervals. Positions 401 to 410 indicate the respective start point of each of the ten MEO satellite relays. The LOS path 380 shown is for a twenty-four hour period and will repeat every twenty-four hours.

Figure 7:
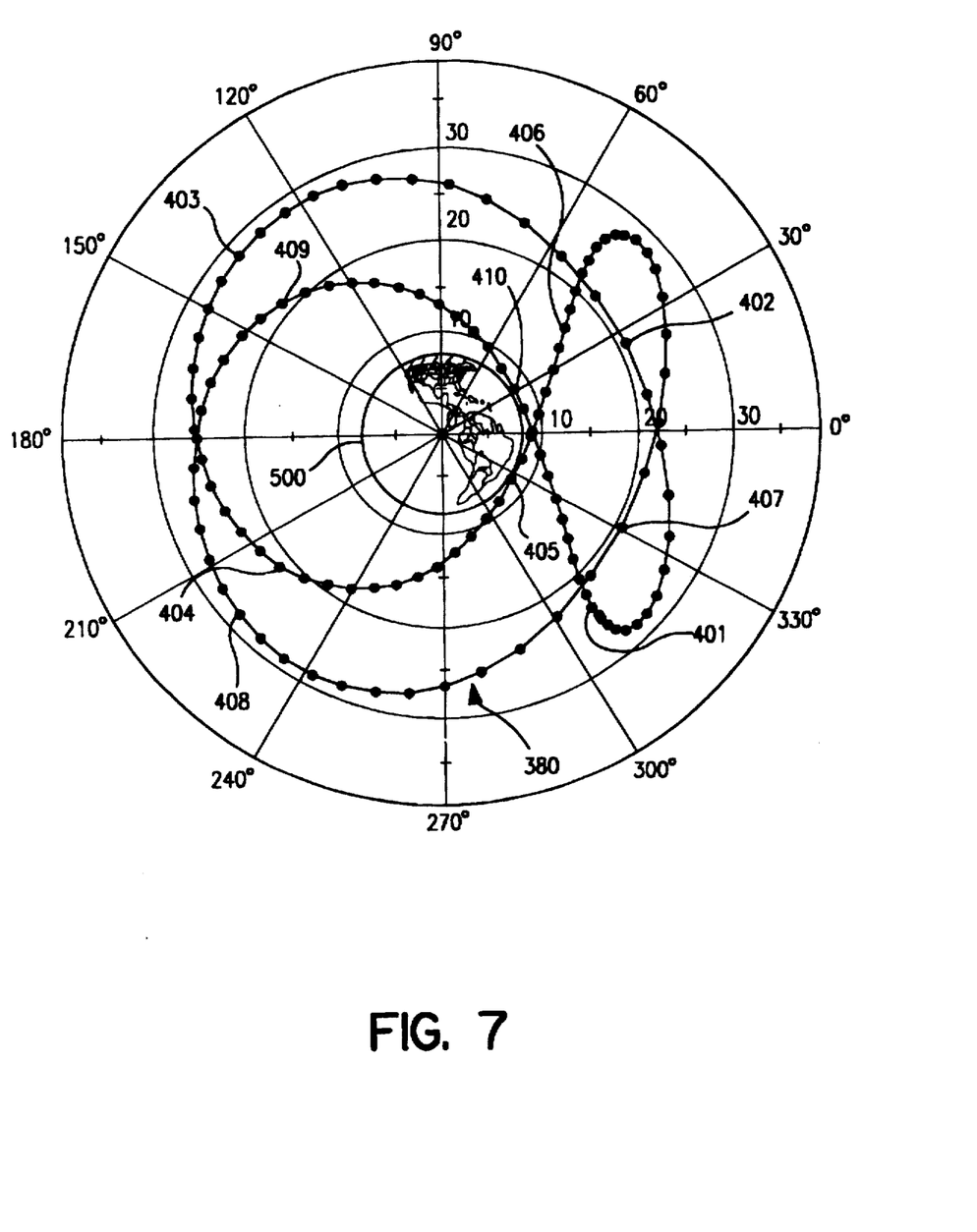
FIG. 7 is a polar plot showing the line-of-sight between a ten MEO satellite relay embodiment and a GEOS satellite relay as viewed from the GEOS satellite.
Figure 8:
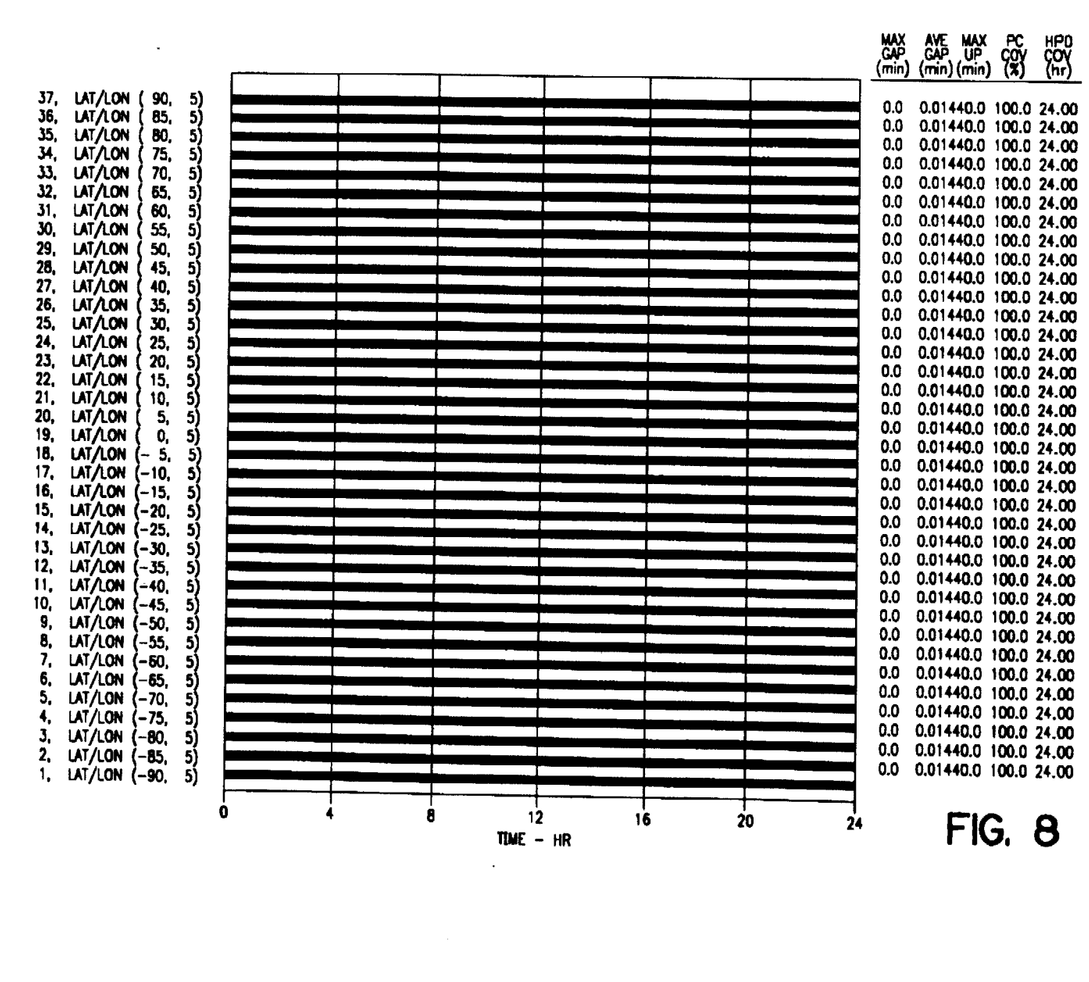
FIG. 8 is a graph showing the coverage that can be achieved with a ten MEO satellite relay embodiment according to the present invention over given latitude and longitude locations.

FIG. 8 graphically illustrates the earth coverage from the same ten MEO satellite relay configuration as described in FIG. 7 (that is, 10 orbital planes; 8 hour period; an altitude of 7501 nautical miles; a 252 degree inter-orbit phasing; 36 degree node spacing; and an inclination angle of 50 degrees). Each bar on the graph shows the extent of 24 hour coverage at a location for a specific latitude. Since all of the bars are solid, there is a continuous LOS for each location to a MEO satellite relay. The ten MEO satellite relays can "see" the earth's surface continuously with a minimum ground elevation angle of 20 degrees angle of LOS above the earth's surface. While FIG. 8 is for one earth longitude, that longitude sweeps approximately 360 degrees of earth rotation in 24 hours, showing that the coverage is global.

While the examples in FIGS. 6 and 7 employ one satellite per orbital plane, it should be understood that the number of orbital planes could be reduced by placing more than one satellite in one or more of these orbital planes.

The present invention also features another satellite relay configuration which has additional advantages. Some configurations, in addition to providing a continuous LOS between a GEOS satellite relay and a MEO satellite relay, also provide above-the-horizon (ATH) viewing for the GEOS-to-MEO satellite relay links.

FIG. 7 is revisited to illustrate the ATH aspect. FIG. 7 shows the view of a GEOS satellite relay "looking down" upon a MEO satellite relay over a twenty-four hour period. An above-the horizon (ATH) link denotes that a MEO satellite relay does not cross in front of the earth 500 at any time during the twenty-four period. Also, a MEO satellite relay does not cross behind the earth 500 relative to the GEOS satellite relay. For 8hour MEO relays, some configurations can be non-ATH. The trace in FIG. 7 would then cross in front of the earth.

Figure 9:
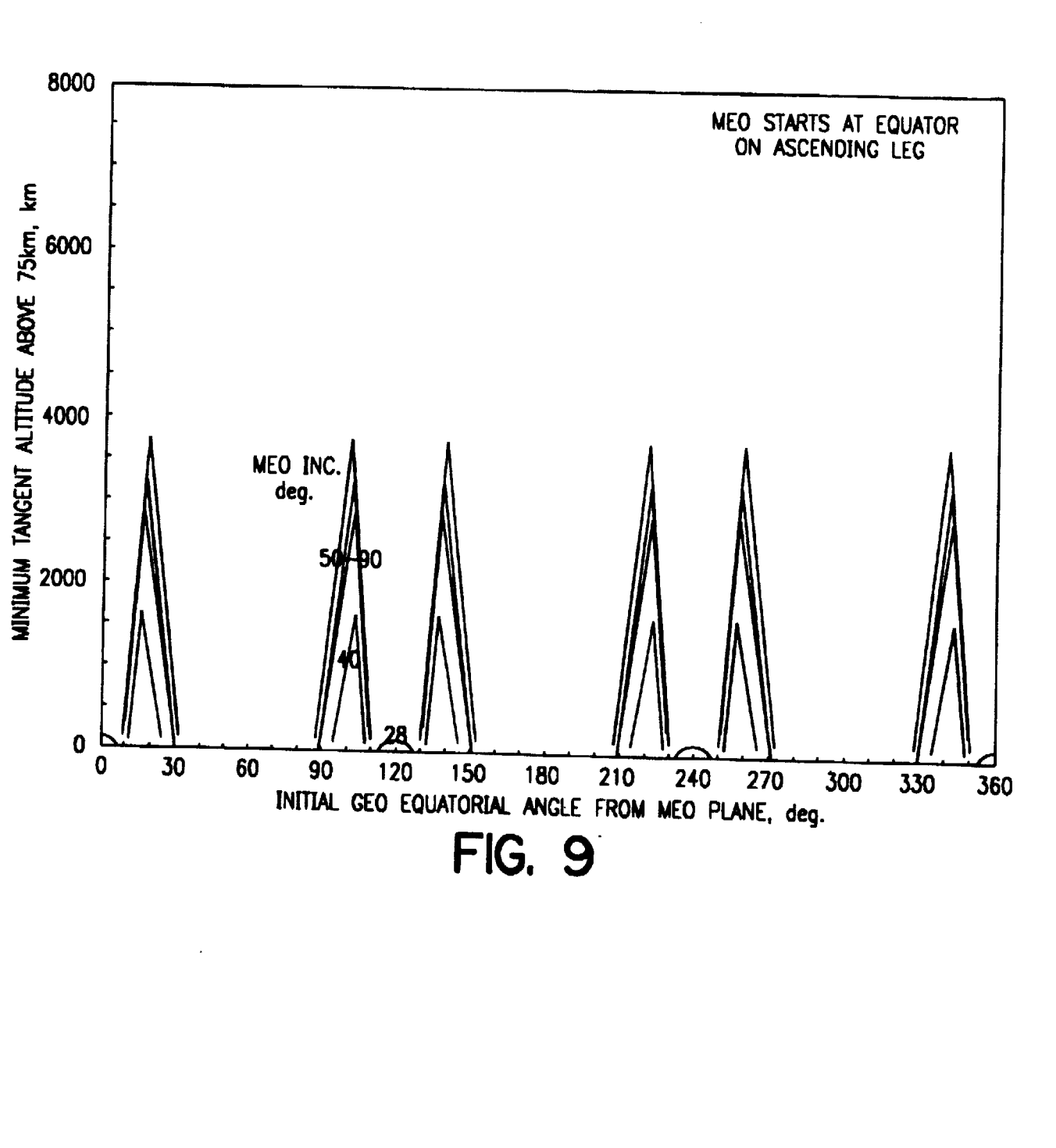
FIG. 9 is a graph showing initial GEOS satellite relay equatorial angle from a MEO satellite relay plane versus minimum tangent altitude above 75 kilometers for valid GEOS satellite relay ranges of an eight-hour MEO period for an above-the-horizon embodiment according to the present invention.

A multiple altitude satellite relay system that is configured for the ATH feature results in a more restricted set of ranges for the synchronization parameters for the eight-hour MEO satellite relay orbits. FIG. 9 shows the valid GEOS satellite relay ranges for an eight-hour ATH MEO satellite relay configuration. The ATH "teepee" shapes illustrate that the choices for the initial GEOS satellite relay angles relative to a MEO satellite relay system are more limited. For constellations of MEO satellite relays, the smaller range of angles will produce some reduction in MEO satellite relay configuration options, with a possible reduction in ground coverage.

Figure 10:
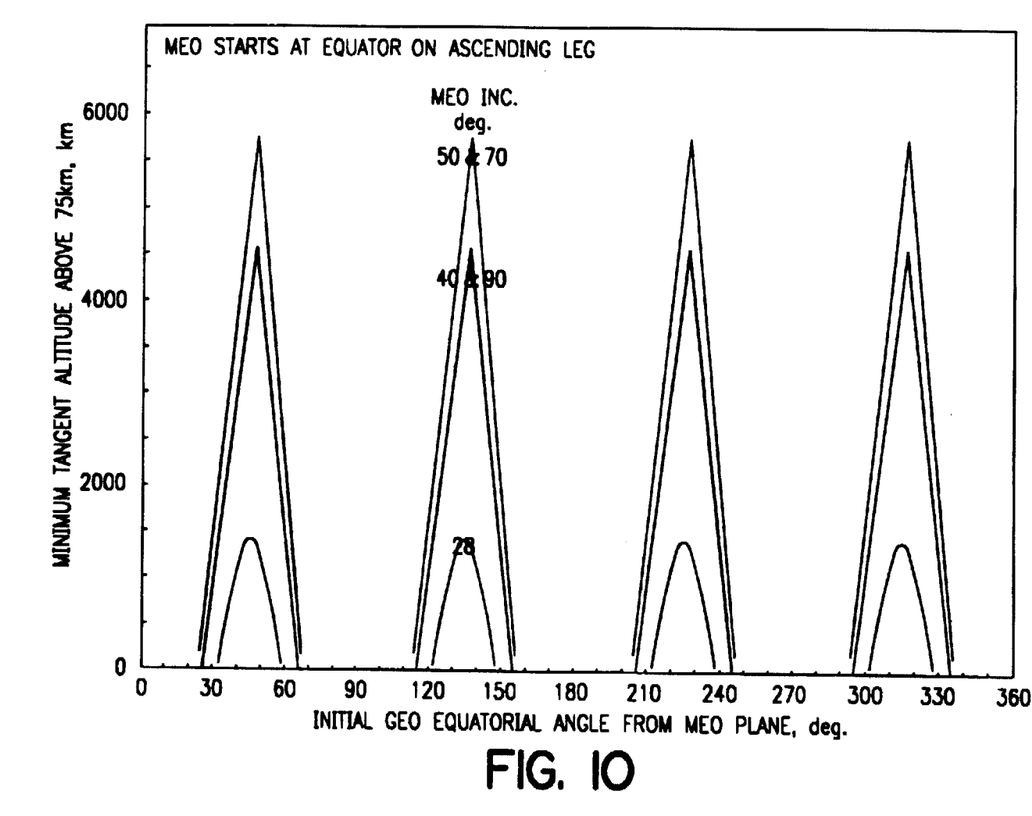
FIG. 10 is a graph showing initial GEOS satellite relay equatorial angle from a MEO satellite relay plane versus minimum tangent altitude above 75 kilometers for valid GEOS ranges of a twelve-hour MEO period for an above-the-horizon embodiment according to the present invention.

However, FIG. 10 illustrates that there would be no additional limitations in a twelve-hour ATH MEO satellite relay configuration. Additional limitations do not result since any twelve-hour ATH MEO satellite relay configuration that provides continuous LOS links also provides continuous ATH links. Therefore a configuration whose ratio of GEOS satellite relay period to MEO satellite relay period is 2:1 will have the ATH feature if they fall within the "teepee" ranges as shown on FIG. 10.

An example of a constellation of inclined MEO satellites that works well with the described architecture is a special case of a Walker Delta Pattern. The Walker Delta Pattern provides an even distribution of satellites in the constellation (see the reference). The special Walker constellation has one satellite per orbit planes, with the total number of satellites being greater than three. A unit of angular measurement in the Walker constellations is the "pattern unit" which is used to describe the relative positions of satellites and orbit planes. The pattern unit is defined as 360 degrees divided by the number of satellites, e.g., if the constellation contained four satellites, the pattern unit would be 90 degrees. Each satellite can be placed one pattern unit (90 degrees in this example) further along in its orbit than the satellite in the adjacent plane to the west. The satellites could just as well be placed at two or three pattern units, and still produce a Walker orbit. In the example of four satellites, if one pattern unit is used for successive satellites that are in eighthour retrace orbits, all the satellites produce the same traces on the ground, that is, all the retrace patterns (FIG. 5) on the earth are the same. The sub-satellite points for each MEO satellite are at different points on the same trace. Because of the geometric relationship, each MEO satellite appears to a GEOS satellite to follow exactly the same path.

The number of satellites can be increased and the same superimposed retrace pattern will be produced, if the satellites are placed at the correct number of pattern units. Successive satellites in a five-satellite constellation must be placed at 2 pattern units, six satellites require 3 pattern units and so on. Any eight-hour retrace Walter constellation with one satellite per orbit plane will produce superimposed ground traces when the number of pattern units is three less than the number of satellites. If a GEOS satellite is positioned within the boundaries of the teepee chart in FIG. 3, continuous links are provided with all the MEO satellites and the paths of the MEO satellites as observed from the GEOS satellite are the same.

When twelve-hour retrace orbits are used, and the number of pattern units is two minus the number of satellites, similar superimposed ground traces are produced, with identical paths carved out by the MEO satellites when observed from the GEOS satellite.

Multiple satellites in each orbit plane can be accommodated with pultiple GEOS satellites. With one GEOS satellite, multiple MEO satellites per orbit can still be used as long as the satellites are positioned within the confines of the teepees in FIG. 3 or 4.

The intention has been described in an exemplary and preferred embodiment, but is not limited thereto. Those skilled in the art will recognize that a number of additional modifications and improvements can be made to the invention without departure from the essential spirit and scope. The scope of the invention should only be limited by the appended set of claims.

We claim:

1. A multiple altitude satellite system which is capable of maintaining continuous, unbroken links between satellites disposed at different altitudes, comprising:
   a first satellite orbiting at a medium-earth-orbit altitude; and
   at least one second satellite orbiting at a geosynchronous orbit altitude, said geosynchronous orbit being synchronized with the orbit of said first satellite to maintain a continuous line-of-sight between said first and second satellites.

2. The multiple altitude satellite system of claim 1 wherein an orbital period of said second satellite relative to an orbital period of said first satellite is at a predetermined ratio.

3. The multiple altitude satellite system of claim 2 wherein said predetermined ratio is a 3:1 ratio.

4. The multiple altitude satellite system of claim 2 wherein said predetermined ratio is a 2:1 ratio.

5. The multiple altitude satellite system of claim 4 wherein said line-of-sight is continuously above-the-horizon of the earth.

6. The multiple altitude satellite system of claim 2 wherein said line-of-sight is continuously above-the-horizon of the earth.

7. The multiple altitude satellite system of claim 1 wherein said line-of-sight is continuously above-the-horizon of the earth.

8. The multiple altitude satellite system of claim 1 wherein distance of said line-of-sight above the earth is based upon position of said second satellite relative to the position of said first satellite and upon inclination angle of orbit plane of said first satellite.

9. The multiple altitude satellite system of claim 8 wherein an orbital period of said second satellite relative to an orbital period of said first satellite is at a predetermined ratio.

10. The multiple altitude satellite system of claim 1 wherein said first satellite includes means for providing a link with said second satellite.

11. The multiple altitude satellite system of claim 10 wherein said link between said first satellite and said second satellite is a radio link.

12. The multiple altitude satellite system of claim 10 wherein said link between said second satellite and said first satellite is a laser-based link.

13. The multiple altitude satellite system of claim 1 wherein said first satellite includes means for providing a link with an earth-based user.

14. The multiple altitude satellite system of claim 1 wherein said first satellite includes means for providing a link with an earth-based control station.

15. The multiple altitude satellite system of claim 1 wherein said first satellite includes means for relaying communications.

16. The multiple altitude satellite system of claim 1 wherein said second satellite includes means for relaying communications.

17. The multiple altitude satellite system of claim 1 wherein said first satellite includes means for relaying data.

18. The multiple altitude satellite system of claim 1 wherein said second satellite includes means for relaying data.

19. A method of providing a multiple altitude satellite system which is capable of maintaining continuous, unbroken links between satellites disposed at different altitudes, comprising the steps of:
    establishing a first satellite at a medium-earth-orbit altitude; and
    synchronizing the orbit of said first satellite with an orbit of at least one communication satellite orbiting at a geosynchronous altitude to maintain a continuous line-of-sight between said first and second satellites.

20. The method of claim 19 further comprising the step of:
    configuring said first satellite so that an orbital period of said second satellite relative to an orbital period of said first satellite is at a predetermined ratio.

21. The method of claim 20 further comprising the step of:
    configuring said first satellite so that an orbital period of said second satellite relative to an orbital period of said first satellite is at a 3:1 ratio.

22. The method of claim 20 further comprising the step of:
    configuring said first satellite so that an orbital period of said second satellite relative to an orbital period of said first satellite is at a 2:1 ratio.

23. The method of claim 22 further comprising the step of: configuring said first satellite to have said line-of-sight to be continuously above-the-horizon of the earth.

24. The method of claim 20 further comprising the step of:
    configuring said first satellite to have said line-of-sight to be continuously above-the-horizon of the earth.

25. The method of claim 19 further comprising the step of:
    configuring said first satellite to have said line-of-sight to be continuously above-the-horizon of the earth.

26. The method of claim 19 further comprising the step of: configuring said first satellite whereby distance of said lineof-sight above the earth is based upon position of said second satellite relative to the position of said first satellite and upon inclination angle of orbit plane of said first satellite.

27. The method of claim 26 further comprising the step of: configuring said first satellite so that an orbital period of said second satellite relative to an orbital period of said first satellite is at a predetermined ratio.

28. The method of claim 19 further comprising the step of: providing a link between said first satellite and said second satellite.

29. The method of claim 28 wherein said link between said first satellite and said second satellite is a radio link.

30. The method of claim 28 wherein said link between said first satellite and said second satellite is a laser-based link.

31. The method of claim 19 further comprising the step of: providing a link between said first satellite and an earth-based user.

32. The method of claim 19 further comprising the step of: providing a link between said second satellite and an earth-based control station.

33. The method of claim 19 further comprising the step of: relaying communications between said first and second satellite.

34. The method of claim 19 further comprising the step of: relaying data between said first and second satellite.

35. The multiple altitude satellite system of claim 1 wherein said first satellite includes means for generating data.

36. The multiple altitude satellite system of claim 1 wherein said second satellite includes means for generating data.

* * * * *